United States Patent

Piret et al.

[11] 4,030,990
[45] June 21, 1977

[54] PROCESS FOR RECOVERING ELECTROLYTIC COPPER OF HIGH PURITY BY MEANS OF REDUCTION ELECTROLYSIS

[75] Inventors: Norbert L. Piret; Hans Joachim Rabben; Herbert Kudelka, all of Duisburg; Siegbert Schmidt, Moers-Vinn, all of Germany

[73] Assignee: Duisburger Kupferhütte, Duisburg, Germany

[22] Filed: June 22, 1976

[21] Appl. No.: 698,558

[30] Foreign Application Priority Data

Oct. 30, 1975 Germany .......................... 2548620

[52] U.S. Cl. ................................................ 204/108
[51] Int. Cl.[2] .......................................... C25C 1/12
[58] Field of Search .................................... 204/108

[56] References Cited

UNITED STATES PATENTS 1,598,296  8/1926  MacKay ............................. 204/108

Primary Examiner—R. L. Andrews
Attorney, Agent, or Firm—Burgess, Dinklage & Sprung

[57] ABSTRACT

Copper sulfate solution obtained by the sulfuric acid leaching of cupriferous material and containing impurities such as Fe, As, Sb, Bi, Se, Te, Sn, Pb, Cl, Ag, Hg, and $PO_4$, are subjected to a two step purification process. In the first step, the pH is adjusted to 2.7–3.3 with, e.g. $Ca(OH)_2$, and the potential in relation to the standard hydrogen electrode is adjusted to at least 575 mv with an oxidizing agent, e.g. air. The temperature is 50°–90° C. Impurities precipitate and are separated. Se, Cl, and possibly Ag and Hg remain in solution and are removed in the second step, wherein the potential is reduced to below 350 mv by addition of a cupriferous reducing agent, e.g. Cu or $Cu_2O$. The pH is below 3 and the temperature is below 50° C. Impurities precipitate as copper (I) compounds, and are separated to provide the solution in condition for the electrolysis. The copper produced is of high purity, having a conductivity of at least 58.8 mho × $m/mm^2$ and a maximum semi-hard temperature of 200° C.

33 Claims, 1 Drawing Figure

FLOW SHEET

PROCESS FOR RECOVERING ELECTROLYTIC COPPER OF HIGH PURITY BY MEANS OF REDUCTION ELECTROLYSIS

BACKGROUND

The present invention concerns a process for recovering electrolytic copper with a high degree of purity by means of reduction electrolysis — hereinafter to be called electrowinning—from copper sulphate solutions obtained in the hydrometallurgical working up, such as, for example, a sulphur leaching, of materials containing copper.

As, generally speaking, the quality of electrolytic copper cannot clearly be designated by its analytic composition alone on account of the reciprocal action of the different impurities, the physical properties of this copper, i.e. its electric conductivity and its semi-hard temperature, also serve as a yardstick for its degree of purity.

Hence, the present invention concerns a process for recovering electrolytic copper with an electric conductivity of at least 58.8 Siemens (mho) x m/mm$^2$ (101.4% IACS, respectively) and a maximum semi-hard temperature of 200° C by means of electrowinning from copper sulphate solutions obtained in the hydrometallurgical working up of materials containing copper.

The copper sulphate solutions, obtained in the hydrometallurgical working up of materials containing copper, usually contain as impurities both such constituents as interfere with electrolysis or have an unfavourable influence upon the purity of the cathode copper owing to simultaneous separation or the formation of electrolytic inclusions and such constituents — hereinafter to be called neutral salts —as show neutral behaviour towards the electrolytic process. The process in accordance with the present invention consist of these copper sulphate solutions being subjected to preliminary treatment—here inafter to be called purification of the solution —prior to being fed into electrowinning for the purpose of removing such elements, contained in the solution, as interfere with the electrolytic process and the quality of the electrolytic copper. In accordance with the present invention, this removal of the disturbing elements is effected in two steps.

The cupiferous materials, conventionally used for the production of the copper sulphate solutions, are the following:

a. cupriferous sulphide concentrates or ores which, for the purpose of producing the copper sulphate solution, are subjected to sulphatizing roasting, for example, with aqueous sulphuric acid leaching being effected subsequently, or to oxidizing pressure leaching in a sulphuric acid medium;

b. cupriferous oxide concentrates such as, for example, carbonates, oxides, and silicates, which, for the purpose of producing the copper sulphate solution, are leached with an aqueous sulphuric acid solution; and c. intermediate metallurgical products and recycling materials such as, for example, copper matte, copper dross, copper precipitates from chemical processes for working up in the wet way, for example, cuprous oxide, basic copper sulphates, copper-arsenic cementates, and other intermediate metallurgical products which, if necessary, are subjected to oxidizing leaching or to leaching with sulphuric acid only.

Owing to the composition of the cupiferous starting materials and depending upon the extraction process, with a usually given level of concentration, the copper sulphate solutions, obtained in the different leaching processes, generally contain so many disturbing secondary constituents that there is an unfavourable influence on either the electrolytic process or the quality of the electrolytic copper produced, or both, if these disturbing elements are not largely removed by means of purification of the solution prior to the copper sulphate solution being fed into electrowinning.

The disturbent factors in question are known to be the following:

a. the iron which has an unfavourable influence upon electolytic performance by decreasing current efficiency and considerably increases corrosion of the cathode suspension loops at the surface of the bath; b. the elements Se, Te, Bi, Sb, As, Sn, Pb, and S, which, depending upon their concentration and, to a certain extent, also on the manner of their inclusion, deteriorate the physical properties, i.e. conductivity and semi-hard temperature, of the electrolytic copper;

c. the chloride ion, which, if present in too high a concentration, can interfere with the electrolytic process in several ways, that is to say, by rapid corrosion of the leadantimony anodes, by pitting corrosion of the high-grade steel used for the production of starter sheet, and, finally, with even higher concentrations present, by incorporating chloride ions in the copper precipitated;

d. the solids content in the electrolyte, which, depending upon the type of solids, can cause nodule formation.

Other secondary constituents such as, for example, salts of Ni, Co, Zn, Mg, Al, Mn, etc., are known to not interfere with electrolysis, provided that the concentration of these so-called neutral salts is kept below a certain upper limit which, by the way, depends upon the electrolytic conditions, i.e. upon the copper concentration, the current density, the electrolytic temperature, etc. As a rule, the current density is adjusted to the composition of the electrolyte for the purpose of precipitating the copper in the form of sufficiently fine crystals, so that electrolytic inclusions, particularly those of sulphur and oxygen, but also those of secondary constituents, possible present, such as, for example, the above-mentioned salts of Ni, Co, Zn, Mg, Al, Mn, etc., are kept at a minimum. The concentration of the neutral salts is maintained below a certain upper limit by means of a continuous or discontinuous discharge of an adequate volume of the electrolyte, as is conventional practice.

Thus, the present invention concerns a process for producing a pure copper sulphate solution from any copper sulphate leach which may contain one or several of the above-mentioned disturbing impurities and neutral salts, with the whole of the copper sulphate leach being subjected to a twostep purification of the leach during which the concentration of the disturbing impurities is reduced so much that there are obtained by subsequent electrowinning copper cathodes of high-purity quality in accordance with the standards stated at the beginning.

As is well known from experience, it is impossible for copper cathodes of the high-purity quality required to be recovered by means of electrowinning from copper sulphate leaches without purifying the whole of the copper sulphate leach for the purpose of removing, the disturbing elements or, at least, reducing their concentration below a limit below which the influence becomes neglible. Even if, in practice, the concentration of the disturbing elements, present in the copper sulphate leach, is maintained at a constant level by either discharging part of the copper sulphate solution or removing the disturbing elements from part of the copper sulphate solution, such measures are not sufficient at all to produce copper cathodes with the high degree of purity desired.

That is to be illustrated by examples from practice:

a. Sulphide copper concentrates, containing 45% Cu and 2.5% Co, are subjected to sulphatizing roasting, with the roasted material being leached with an aqueous sulphur acid solution for the purpose of extracting the copper (see P. H. Charles and P. Hannaert, "Copper Metallurgy". Edited by R. P. Ehrlich. AIME. New York, 1970 pp. 240 – 259). The copper sulphate leach obtained is subjected for the purpose of removing the selenium to a single-step purification of the leach subsequent to the leaching residue being separated.

The leach having been clarified without filtration, the copper sulphate solution is fed into the electrowinning cycle. There are removed only disturbing impurities such as Fe, As, etc. and neutral salts such as, among others, Mg, Al, and Co, by means of discharging part of the electrolyte volume from the electrolyte cycle. Electrolysis is performed from an electrolyte, containing 30 g/l Cu, 40 g/l Co, 70 g/l $H_2SO_4$, and 2.5 g/l Fe, the current efficiency amounting to 85 – 90%; the cathodes, thus obtained, contain 99.7% Cu. These cathodes do not come up to the high degree of purity of the cathodes which can be produced by the process in accordance with the present invention; therefore, they have to be subjected to further refining, that is to say, to fire refining. Hence, it follows that the single leach purification step, effected for the purpose of removing the selenium, is not sufficient to produce cathodes with a high degree of purity. Moreover, in view of a current efficiency of 85 – 90%, the electrolytic performance is rather middling.

b. According to another example from practice (see C. B. Kettering and K. L. Power, AIME Annual Meeting. New York. Feb. 16 – 20, 1958. Preprint 5817 P 10), copper ores, containing about .86% copper in all — 0.46% oxide copper and 0.40% sulphide copper —, are leached in vats with an aqueous sulphuric acid solution containing iron. The copper sulphate solution, containing about 25 g/l Cu, 6.5 g/l Fe in all, 0.7 g/l of which is $Fe^{3+}$, is fed into electrowinning and electrolized with a current density of about 150 A/m² and at a temperature of 40° C. The electrolyte contains 20 g/l Cu, 17 g/l $H_2SO_4$, 6.5 g/l Fe — 3.7 g/l of which $Fe^{3+}$ is. The current efficiency is very low, e.g. 76%, the cathodes contain about 99.0% Cu. The cathodes produced are not equal to the high degree of purity achieved by the process according to the present invention.

c. According to a third example (see L. R. Verney, J. E. Harper, P. N. Vernon in "Electrometallurgy". Ed. Henrie, Baker, Cleveland. 1969. pp. 288 – 291). a cppper sulphate solution is obtained by means of aqueous sulphuric acid leaching of sulphide and oxide copper concentrates subjected to sulphatizing roasting. There is no purification of the leach; there is only a partial removal in a side-stream (by-pass) of the iron in solution. Prior to being fed into electrowinning, the copper sulphate leach contains the following impurities;

|  | g/l |  | g/l |
| --- | --- | --- | --- |
| Fe, in all | 10 | Mg | 10 |
| $Fe^{3+}$ | 6.0 | Al | 10 |
| Co | 3.0 |  | m/gl |
| Ni | .6 | Bi | 40 |
| Mn | 2.0 | Se | .7 |

Electrolyis is effected at about 185 A/m², current efficiency amount to only about 77%. These cathodes are not equal to the high degree of purity desired, on account of the high amounts of Se, Bi, and Pb as shown in the following table:

|  | ppm |  | ppm |
| --- | --- | --- | --- |
| Fe | 2 | Se | 5 |
| Ni | 1 | Pb | 15 |
| Bi | 3 | As | .5 | d. According to a last example from practice (see Transactions AIME, Vol. 106. pp. 559 – 608), anoxide copper ore, containing about 1.7% Cu and 0.2 – 0.3% Cl⁻, is leached in a leaching basin with an aqueous sulphuric acid solution. The copper sulphate leach, containing considerable amounts of impurities, had the following average composition:

|  | g/l |  | g/l |
| --- | --- | --- | --- |
| Cu | 40 | Mg | 8 |
| $H_2SO_4$ | 10 | Mn | 8 |
| Fe | 15 | Cl | 1.5 |
| Al | 15 | $SiO_2$ | 3 |

Subsequent to being dechlorinated with cement copper to 0.05 g/l Cl⁻, the copper sulphate solution with a solids content of about 100 – 200 mg/l is decopperized step by step to about 10 g/l Cu in the electrolytic way, the average current density amounting to 130 A/,², and the temperature being 40° C. The current efficiency is very low, amounting to an average 50%. On account of their considerable impurity content, the cathodes, containing 99.7% Cu, are subjected to fire refining.

It follows from all the example given, that it is impossible to obtain electrolytic copper with a high degree of purity by means of electrowinning from a conventional copper sulphate leach containing impurities.

There is a process, it is true, known to be capable of obtaining a pure copper sulphate solution from a conventional copper sulphate leach containing impurities, that is to say, a process by which the $Cu^{2+}$ ion is at least partially removed from the copper sulphate leach, containing impurities, by means of extraction with the aid of a liquid ion exchanger and conveyed into a sulphuric solution. While this process is suitable for working up a copper sulphate leach with a low concentration such as, for example, 2–10 g/l Cu (see Mining Magazine. September, 1974. pp. 165–169; World MIning, April, 1971, pp. 46–48), its application will be the more unattractive for metallurgical and economical reasons, the higher the copper concentration in the copper sulphate leach. This is due to the fact that, in the presence of higher concentrations, there has to be used an extraction solvent which combines with the copper more firmly; hence, there must be present more highly concentrated sulphuric solutions if the $Cu^{2+}$ ions are to be conveyed into the sulphur acid. Therefore, electrowinning must be effected with a higher $H_2SO_4$ concentration of, for example, >200 g/l $H_2SO_4$, which is known to cause considerable operating trouble such as, for example, corrosion of the conventional Pb-Sb anodes and conveyance of Pb and Sb into the copper cathodes. Other types of anodes, such as, for example, the expensive D.S.A. anodes — i.e. Dimensional Stable Anodes; Ti coated with mixed oxides of Pt metals — or Pb-Ca anodes should be mentioned in this context.

Also, there is this known alternative to the above-mentioned extraction with the aid of an extraction solvent fixing the copper more firmly: the process in question is carried out with a conventional extraction solvent used in the working up of a low-concentration copper sulphate leach, with the sulphuric acid, formed by means of an intermediate neutralization with a calcium hydroxide suspension, being fixed as gypsum and the gypsum being separated from the three-phase system (see DBP 24 10 158). However, this has the disadvantage of requiring working with a three-phase system.

THE INVENTION

By contrast with that, the process in accordance with the present invention, starting from any copper sulphate leach, produces a copper sulphate solution in which there is not only a sufficient decrease in the concentration of the disturbing elements, which results in the opportunity of producing copper cathodes with a high degree of purity by means of electrowinning but also a sulphuric acid concentration which remains low during electrolysis, i.e.<100 g/l, so that in contrast with the extraction process with a liquid ion exchanger, described above, there does not occur the operating trouble mentioned above.

It has been found that the pure copper sulphate solution, required for the production of high-purity electrolytic copper in electrowinning, can be produced in accordance with the present invention from any copper sulphate leach by means of two-step purification of the leach.

The process in accordance with the present invention has the following features: the purification of the leach is effected in two steps, with the copper sulphate leach being treated in the first step in such a manner as to obtain and maintain in the solution, at a pH value of 2.7–3.3, preferably 2.9–3.1, a potential of at least 575 mv in relation to the standard $H_2$ electrode (and 325 mv in relation to the saturated calomel electrode, respectively) with the potential preferably being 590–670 mv (and 350–430 mv in relation to the saturated calomel electrode, respectively); the compounds, insoluble under these conditions, are removed from the copper sulphate solution by means of solid-liquid separation, and, in the second step, with a reducing agent being added, the potential is reduced to below 350 mv in relation to the standard $H_2$ electrode (and to 110 mv in relation to the saturated calomel electrode, respectively), preferably to 340–300 mv (and to 100–60 mv in relation to the calomel electrode, respectively), so that there are formed in the copper sulphate solution copper (I) compounds which are removed from the solution by means of fine filtration.

THE FIRST STEP

In order to obtain the conditions of the first step it is necessary to add an oxidizing agent and a neutralizing agent to the copper sulphate leach. There can be used as an oxidizing agent air, oxygen or a gas containing $O_2$. Other oxidizing agents, too, such as, for example, $H_2O_2$ or $MnO_2$, can be used alone or in combination with one of the oxidizing agents mentioned before. However, for reasons of process technology and economy, oxidation is preferably effected with commercial oxygen.

There are used as neutralizing agents such substances as consume sulphuric acid, which substances do not convey into the copper sulphate solution any significant amounts of neutral salts. Correspondingly, there are eligible copper and copper compounds, consuming sulphuric acid, such as, for example, Cu (as cement copper, for example), $Cu_2O$ (as commercial cuprous oxide), $Cu(OH)_2$, $CuCO_3$, basic copper sulphates, of other compounds than those of copper are used then the cation of the neutralizing agent should form with the sulphate ion a compound of low solubility, e.g. if calcium compounds, consuming sulphuric acid, such as, for example, $Ca(OH)_2$, lime milk and $CaCO_3$, are used, the calcium ion solubility would be less than 1 g/l.

This first step is operated at a temperature of 50°–90° C, preferably at 60°–80° C.

In this first step the following disturbing elements are removed from the solutions either as hydrolytic products or as salts difficult to dissolve: Fe, As, Sb, Bi, Sn, Te, $PO_4^{3-}$, etc.

The solubility limit of the constituents removed is sufficiently low under the conditions obtaining in the first step, so that their residual concentrations do not have any detrimental effect upon the electrolytic process or upon the qualify of the cathodes.

It is common knowledge that, the arsenic is precipitated as iron arsenate ($FeAsO_4$) and the phosphate as iron phosphate ($FePO_4$) or as calcium phosphate. This is conditional on a sufficient amount of iron being present in the copper sulphate leach, so that the As can enter into the compound $FeAsO_4$ and the phosphorus into $FePO_4$. For this purpose, there is required in the copper sulphate leach an iron concentration which amounts to at least about 120% of the stoichiometric amount for the formation of these compounds. Furthermore, it has been found that the iron concentration, required for the arsenic precipitation, also depends on the valence of the iron and arsenic ions. The amount of iron required decreases as the ratio of $Fe^{2+}$ to $As^{5+}$ in the copper sulphate leach increases. Conversely, the amount of iron required increases as the ratio of $Fe^{3+}$ to $As^{3+}$ increases. This is due to the fact that part of the iron in the latter case is hydrolyzed before it has a chance to bind the arsenic as arsenate.

Moreover, any silicic acid that might be present, is at least partially precipitated simultaneously in the course of the first step of the purification of the leach. The insoluble compounds, formed under these conditions, are separated from the copper sulphate solution by means of conventional solid-liquid separation.

The process in accordance with the invention does not exclude the possibility of directly conveying into the first step of purification the starting leach, intended for the twostep purification of the leach, without filtering, that is to say, together with the undissolved solid particles derived from its production process, and of separating the undissolved solid particles from the copper sulphate solution by means of solid-liquid separation together with the insoluble compounds formed in the first step of purification.

THE SECOND STEP

Subsequent to the first step of purification, the weakly acid copper sulphate solution obtained, the pH value of which can be about 3, may contain selenium, chloride, and, possibly, small amounts of silver and mercury.

For the purpose of removing these disturbing elements, particularly the quadrivalent selenium and the chloride ion, the copper sulphate solution is conveyed into the second step of purification, with the $Se^{4+}$ being precipitated as $Cu_2Se$, which is difficult to dissolve, and the chloride being precipitated as $Cu_2Cl_2$.

As the solubility of CuCl depends on the temperature, adequate precipitation can only be obtained if the temperature of the copper sulphate solution is decreased preferably prior to the second step of purification, to below 50° C, preferably to a temperature between 45° C and the crystallization temperature of the copper sulphate solution, i.e. the temperature at which copper sulfate would commence to precipitate. In this step there is simultaneously effected an extensive removal of the silver and the mercury.

There can be used as a reducer any substance sufficiently reducing, provided that the level of impurity in the copper sulphate solution, already partially purified, is not substantially increased by means of this substance being added. Accordingly, the reducers, preferably used for this purpose, are cupriferous reducers and $SO_2$ or gases or solutions containing $SO_2$, respectively. It is common knowledge that the cupriferous reducers used are materials containing $Cu^0$, such as, for example, cement copper, finely distributed scrap copper, granulated Cu metal, etc., or materials containing $Cu^+$, such as, for example, commercial cuprous oxide ($Cu_2O$), or a diluted sulphuric suspension of this cuprous oxide. It is convenient for the pH value in this second step of purification of the leach to amount to between 1.5 and 2.5, which can be provided by, e.g., employing as the reducing agent, a sulphuric acid suspension of cuprous oxide.

The reactions, taking place under these conditions, can be simplified as follows:

a) Formation of the copper (I) ion b) Chloride precipitation c) Selenium precipitation These copper (I) compounds, which are difficult to dissolve, are formed in the course of the second step of purification; these compounds and, possibly, silver and mercury are removed from the solution by means of fine filtration. A fine filtration, preferably used, is the so-called precoat filtration, effected either by means of rotary filters or pressure filtration such as, for example, on candle filters, so that the filtered solution has a solids content of less than 20 mg/l, preferably less than 10 mg/l.

The copper sulphate solution, thus treated, is called strong electrolyte; it is characterized by a. a low concentration of free sulphuric acid, amounting to between about 2 and 5 g/l;
b. a solids concentration of below 20 mg/l, preferably below 10 mg/l;
c. a sufficiently low concentration of disturbing elements, such as, for example, Fe, As, Sb, Bi, Se, Te, Sn, Pb, $Cl^-$, Ag, Hg, $PO_4^{3-}$.

ELECTROLYSIS

This strong electrolyte is then added to the electrolyte cycle as required. As the strong electrolyte may generally contain, besides the residual concentrations of the elements mentioned above, one or several neutral salts, too, such as, for example, those of Ni, Co, Zn, Mg, Al, Mn, etc., and adequate volume of the electrolyte is continuously or discontinuously withdrawn from the electrolyte cycle in order to keep constant the concentration of the neutral salts possibly present.

In accordance with the present invention there is obtained from this electrolyte during electrowinning with a current density, adjusted to the composition of the electrolyte for the purpose of precipitating close-grained, finely crystalline copper cathodes free from electrolyte inclusions, electrolytic copper which is characterized by its electric conductivity of at least 58.8 Siemens (mho) $m/mm^2$ and a maximum semi-hard temperature of 200° C.

The process makes possible a high electrolysis performance as a result of good current efficiency of over 90%, even amounting, as a rule, to 92 to 95%. A further advantage is the relatively low concentration of free sulphuric acid in the electrolyte cycle, which, as a rule, does not exceed 100 g/l, and preferably amounts to between 75 and 85 g/l. Under these conditions, experience goes to show that the service life of the conventional Pb - Sb anodes is longer than in the case of higher sulphuric acid concentrations.

Figure 1:
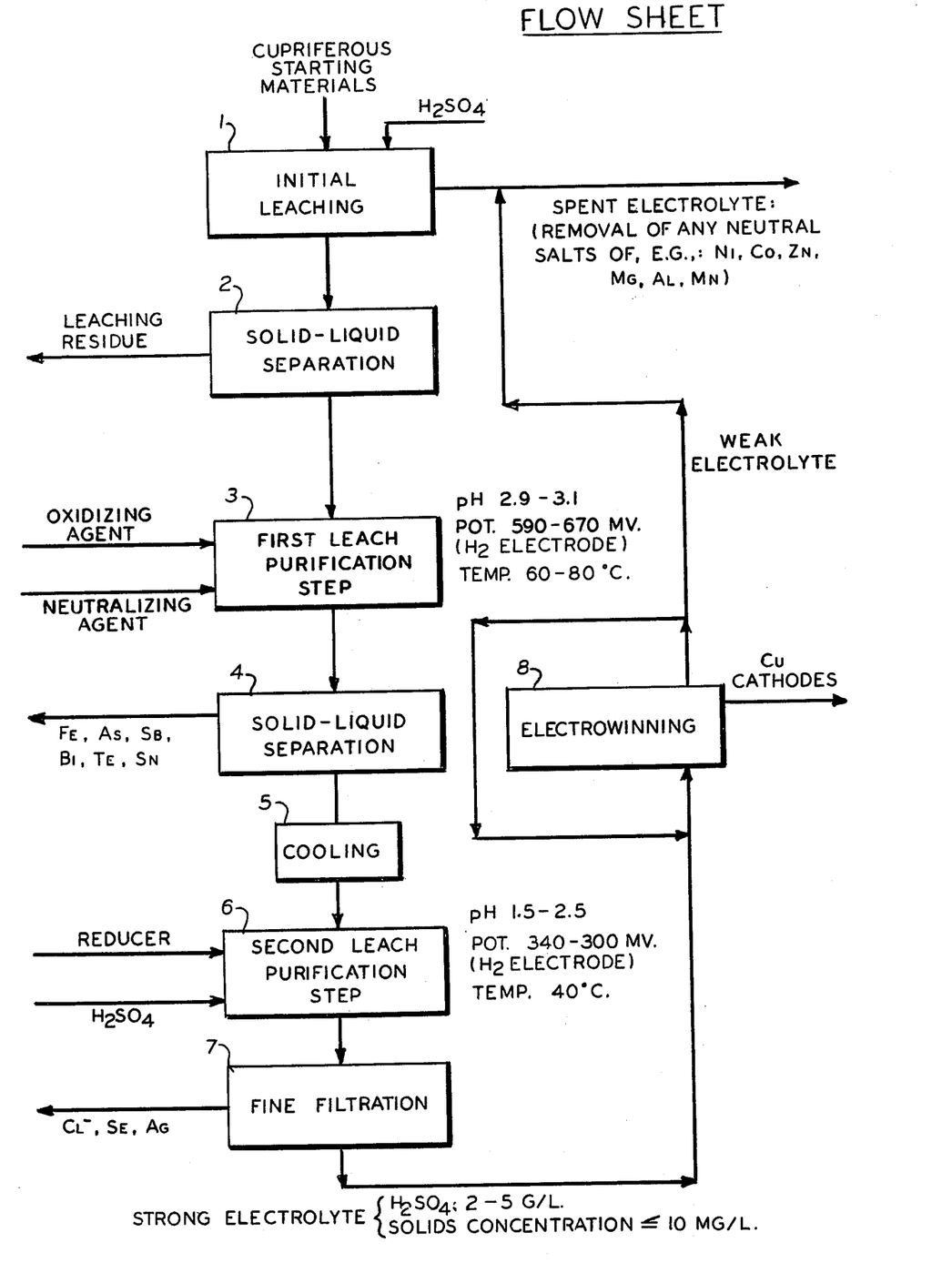

The following three examples with tables are to illustrate the process in accordance with the present invention without limiting it thereto. The flow sheet enclosed shows the operation of the process in accordance with the present invention.

EXAMPLE 1 (Table 1)

A copper concentrate (A) with 66.3% Cu, in which the copper present was partly metallic and partly oxide, was subjected to oxidizing leaching with a return electrolyte (B) of average composition, with commercial oxygen, and sulphuric acid being added. The potential in relation to the hydrogen electrode amounted to 525 mv at 75° C, with a pH value of 1.5.

The copper sulphate solution was first subjected to the first step of purification of the leach, there being a temperature of 75° C,
a pH value of 3.0 – 3.1,
a potential of 655 mv (in relation to the $H_2$ electrode), and
a retention time of 2 hours.

The potential value was obtained by means of oxidation, with 7.5 standard $m^3/hm^3$ of commercial oxygen being added. The pH value was obtained by the controlled feeding in of a $CaCO_3$ suspension, with $CaCO_3$ consumption amounting to 16.6 $kg/m^3$. The precipitate, obtained under these conditions, and chiefly containing iron, arsenic, and gypsum, was separated from the solution by means of thickening and filtration, followed by washing. Solution D, having the composition stated in Table 1, was then cooled from 75° C to below 45° C and subsequently conveyed into the second step of purification of the leach, in which there were the following conditions:

| | |
|---|---|
| temperature | 40 – 45° C |
| pH value | 1.8 |
| potential | 305 mv (related to the $H_2$ electrode) |
| retention time | <10 minutes. |

The potential value was obtained by means of the controlled feeding in of 9 kg/m³ commercial cuprous oxide (for composition, see Table 1, E). The pH value desired was obtained by adding 8 kg/m³ of sulphuric acid. Subsequently, there was effected fine filtration of the suspension via a precoat rotary filter. The filtrate, the so-called strong electrolyte (for its composition see Table 1, F), contained less than 10 mg/l of solids, and controlled amounts of it were continuously fed into the electrolyte cycle, this being done in such a manner as to cause copper depletion by 50 g/l to take place with a current density of 200 A/m².

The conditions of electrolysis were as follows:

| | |
|---|---|
| copper concentration | 25 g/l |
| current density | 200 A/m² |
| bath temperature | 50° C |
| glue added | 120 g/t Cu |
| electrolyte rate of flow | .18 m³/hm² cathode surface |
| cathode cycle | 9 days |
| cathode dimensions | .9 × .95 m² |
| cathode weight | 85 kg |

This experiment on a semi-technical scale was carried out until the production of electrolytic copper in the form of cathodes amounted to 6 tons. For thus purpose there were produced by the process in accordance with the present invention 120 m³ of strong electrolyte. Current efficiency amounted to 92%. The cathodes had an average composition as shown in Table 1, G; they had an average electric conductivity of 59.05 m × mho/mm² with variations of ± 0.15 m × mho/mm² and a semi-hard temperature of 189.3° C with variations of ± 10° C.

EXAMPLE 2, (TABLE 2)

A commercial cuprous oxide of the composition, shown in Table 2, A was subjected to oxidizing leaching in a weak electrolyte of the composition, shown in Table 2, B, with commercial oxygen being fed in. Subsequently, the first step of leach purification was carried out in the suspension without the leaching residue being separated.

For this purification, the cuprous oxide itself was used as a neutralizing agent. For the initial leaching and for the first step of leach purification, 10 m³ of weak electrolyte were used per 1 ton of cuprous oxide under the following conditions:

| | Cuprous oxide leaching | First step of leach purification |
|---|---|---|
| Temperature, ° C | 75 | 75 |
| Oxygen supply, m³/hm³ | 5 | 2.5 |
| Potential, related to $H_2$ electrode, mv | 345 | 590 |
| Retention time, mins. | 60 | 60 |
| pH value | | 3.1 |

Subsequent to the first step of leach purification, the suspension was filtered for the purpose of simultaneously removing the initial leach residue and the precipitate. The composition of the copper sulphate solution obtained (see Table 2, D) shows the following by comparison with the composition of the leach prior to the first step of purification (see Table 2, C):

a. an extensive removal of the iron and the arsenic;
b. a very low residual concentration of Sn, Sb, and Bi;
c. a decrease in $SiO_2$ concentration from 0.67 g/l to 0.39 g/l.

Prior to the second step of purification, the temperature of the copper sulphate solution was decreased to 45° C. With 7 kg/m³ of cuprous oxide and sulphuric acid being added, there were obtained a pH value of 1.7 and a potential value of 315 mv in relation to the $H_2$ electrode.

Thus, the chloride concentration was decreased from 0.78 g/l to 0.067 g/l. Subsequent to fine filtration, there were below 10 mg/l of solids contained in the strong electrolyte (for its composition, see Table 2, E).

Controlled amounts of this strong electrolyte were then fed into the electrolyte cycle continuously, this being done in such a manner as to cause copper depletion by 50 g/l to take place with a current density of 200 A/m². The conditions of electrolysis were the same as those in Example 1.

Electrolysis was carried out until the production of electrolytic copper in the form of cathodes amounted to 70 tons. For this purpose there were produced by the process in accordance with the present invention 1400 m³ of strong electrolyte. Current efficiency amounted to an average 93%. The average composition of the cathodes was that shown in Table 2, F; the cathodes had an average electric conductivity of 58.9 mho × m/mm² and a semi-hard temperature of 198.9° C.

EXAMPLE 3 (TABLE 3)

The Behaviour of Secondary Elements during the Two-Step Leach Purification of the Copper Sulphate Solution For the purpose of examining the behaviour of the secondary elements and neutral salts, respectively, during the two-step purification of the leach, the following impurities were added to a synthetic copper sulphate solution:

Fe as $Fe^{2+}$-sulphate and $Fe^{3+}$-sulphate
As as $AsO_3^{3-}$
Zn, Ni, Co, Mg, Mn (bivalent) as sulphates Al as $Al^{3+}$-sulphate
Cl as NaCl
Sn as $Sn^{2+}$
Sb as $Sb^{3+}$
Bi as $Bi^{3+}$
P as $PO_4^{3-}$
Se as $SeO_3^{2-}$ and $SeO_4^{2-}$
Te as $TeO_3^{2-}$ and $TeO_4^{2-}$ Moreover, the solution was saturated with Pb, Ag, and Hg at 70° C. For its composition, see Table 3, A. At 70° C the pH value amounted to 1.0. This solution was then conveyed into the first step of leach purification. In order to obtain the conditions, i.e. pH × 3.1 and potential × 645 mv in relation to the standard $H_2$ electrode at 70° C, 12.5 standard $m^3/hm^3$ of oxygen were fed in and 41 kg of $CaCO_3/m^3$ consumed.

Subsequent to filtration of the suspension the copper sulphate solution had the composition shown in Table 3, B. It is obvious from this that there has taken place an extensive removal of the iron, arsenic, and phosphorus.

In addition to that it was possible to decrease the concentration of the disturbing elements Bi, Sb, Sn, and Te to a very low level.

Although a considerably amount of the selenium — about 88% — was also removed, the $Se^{4+}$ concentration of 4 mg/l was not sufficiently low. Subsequent to being cooled to 40° C, this solution was subjected to the second step of leach purification. For this purpose, controlled amounts of pure cuprous oxide (C) — i.e. 17 kg/$m^3$ — and concentrated sulphuric acid — i.e. 18 kg/$m^3$ — were fed in, with the potential amounting to pH value to 1.6. Subsequent to fine filtration, the solution contained only 44 mg/l $Cl^-$, 1 mg/l Ag, .9 mg/l Hg, and <1 mg/l $Se^{4+}$ — see Table 3, D. As is well known, the residual selenium concentration of 6.5 mg/l as $Se^{6+}$ does not interfere with electrolysis.

These examples prove that, starting from any copper sulphate solution, the two-step leach purification process in accordance with the present invention can produce a copper sulphate electrolyte from which there can be produced by means of electrowinning, electrolytic copper possessing the high quality required.

DRAWING

Cupriferous staring material is leached with $H_2SO_4$ in initial leach 1; the residue is separated at 2, and the first step is performed by leaching 3 and separation 4. The solution is cooled 5 and then subjected to the second step by leaching 6 and separation 7. The resulting solution is subject to electrolysis 8. The weak electrolyte is recycled to the initial leach 1, while a portion thereof is withdrawn from the process.

Example 1, Table 1

| | A | B | C | D | E | F | G |
|---|---|---|---|---|---|---|---|
| | Concentrate, as % (Ag, as g/t) | Return or Weak Electrolyte, as g/l | Leach, as g/l | Leach after 1st Purification Step, as g/l | Commercial Cuprous Oxide, as % | Leach after 2nd Purification Step or Strong Electrolyte, as g/l | Cathodes, as ppm (Cu, as %) |
| Cu | 66.3 | 25 | 80 | 77 | 52.3 | 78 | 99.95 |
| $H_2SO_4$ | | 85 | 10 | <0.1 | | 4 | |
| $Fe_{total}$ | 12.4 | 0.40 | 10.5 | 0.35 | 1.2 | 0.40 | 3.5 |
| $Fe^{3+}$ | | 0.5 | | | | | |
| As | 1.6 | 0.04 | 1.3 | 0.04 | 0.1 | 0.04 | 1.6 |
| $Cl^-$ | 0.09 | 0.06 | 0.1 | 0.1 | 0.8 | 0.06 | |
| Mn | 0.5 | 1.1 | 1.5 | 1.5 | | 1.5 | |
| Mg | 0.75 | 1.2 | 1.35 | 1.35 | 0.4 | 1.35 | |
| Ca | 0.2 | 0.7 | 0.7 | 0.7 | 4.7 | 0.7 | |
| Al | 0.4 | 0.1 | 0.15 | 0.15 | 1.0 | 0.15 | |
| $SiO_2$ | 3.7 | 0.23 | | | 5.7 | 0.25 | |
| Zn | 0.1 | 0.4 | | | 2.0 | 0.5 | <3.5 |
| Ni | 0.02 | 0.04 | | | 0.03 | 0.04 | 4.0 |
| Co | 0.02 | 0.05 | | | 0.02 | 0.05 | 2.0 |
| Sn | | 0.001 | | | 0.1 | 0.001 | <0.1 |
| Sb | 0.002 | 0.002 | | | 0.03 | 0.002 | 1.9 |
| Bi | | 0.001 | | | 0.014 | 0.001 | 0.3 |
| Pb | 0.05 | 0.006 | | | 1.4 | 0.008 | 0.4 |
| S | 0.75 | | | | 3.4 | | 7.0 |
| Se | 0.003 | <0.0001 | | | 0.015 | | 0.2 |
| Te | 0.006 | <0.001 | | | 0.005 | | 1.0 |
| Ag | 57 | | | | | 5.0 | |
| Solids | | <0.01 | | | | <0.01 | |

315 mv in relation to the standard $H_2$ electrode and the

Example 2, Table 2

| | A Intermediate Metallurgical Product, as % (Commercial Cuprous Oxide) | B Return or Weak Electrolyte, as g/l | C Leach Prior to 1st Purification Step, as g/l | D Leach after 1st Purification Step, as g/l | E Leach after 2nd Purification Step, as g/l Strong Electrolyte | F Cathodes, as ppm (Cu, as %) |
|---|---|---|---|---|---|---|
| Cu | 53.5 | 25.0 | | | 76.9 | 99.95 |
| $H_2SO_4$ | | 80.0 | pH = 1,0 | <0.1 | 2.0 | |
| $Fe_{total}$ | 1.13 | 0.18 | 0.63 | 0.15 | 0.17 | 5.6 |
| As | 0.12 | 0.021 | 0.117 | 0.019 | 0.023 | 1.6 |
| $Cl^-$ | 0.83 | 0.081 | 0.78 | 0.78 | 0.067 | |
| Mn | 0.066 | 0.24 | | | 0.24 | |
| Mg | 0.30 | 1.10 | | | 1.00 | |
| Ca | 6.10 | 0.64 | | | 0.65 | |
| Al | 1.05 | 0.40 | | | 0.45 | |
| $SiO_2$ | 5.65 | 0.35 | 0.67 | 0.39 | 0.41 | |
| Zn | 2.0 | 9.1 | | | 8.8 | <3.5 |
| Ni | 0.027 | 0.093 | | | 0.098 | 4.8 |
| Co | 0.019 | 0.078 | | | 0.08 | 3.8 |
| Sn | 0.093 | 0.0025 | 0.011 | <0.001 | 0.0016 | <0.1 |
| Sb | 0.027 | 0.007 | 0.014 | 0.005 | 0.005 | 2.1 |
| Bi | 0.014 | 0.0021 | 0.011 | 0.001 | 0.0025 | 0.4 |
| Pb | 1.44 | 0.006 | 0.017 | | 0.007 | 0.5 |
| S | 3.5 | | | | | 11 |
| Se | 0.017 | 0.0003 | | | 0.0003 | 0.2 |
| Te | 0.005 | 0.0035 | | | 0.003 | 1.0 |
| P | 0.085 | 0.025 | 0.081 | 0.037 | 0.029 | 4 |

Example 2, Table 2-continued

|   | A<br>Intermediate Metallurgical Product, as %<br>(Commercial Cuprous Oxide) | B<br>Return or Weak Electrolyte, as g/l | C<br>Leach Prior to 1st Purification Step, as g/l | D<br>Leach after 1st Purification Step, as g/l | E<br>Leach after 2nd Purification Step, as g/l Strong Electrolyte | F<br>Cathodes, as ppm (Cu, as %) |
|---|---|---|---|---|---|---|
| Ag | 0.249 | 0.007 |  |  | 0.0008 | 4.0 |
| Solids |  |  |  |  | <0.01 |  |

Example 3, Table 3

|   | A<br>Leach, as g/l | B<br>Leach after 1st Purification Step, as g/l | C<br>Cuprous Oxide, as % | D<br>Leach after 2nd Purifcation Step, as g/l |
|---|---|---|---|---|
| Cu | 72.9 | 66.8 | 84.4 | 68.2 |
| $H_2SO_4$ | pH 1.0 | (pH 3.0) <0.1 |  | pH 1.6 |
| $Fe_{total}$ | 6.00 | 0.064 |  | 0.10 |
| $Fe^{3+}$ | 1.2 |  |  | 0 |
| As | 1.98 | 0.045 |  | 0.041 |
| Cl$^-$ | 2.45 | 2.19 | 1.36 | 0.044 |
| Mn | 3.07 | 2.87 |  | 2.84 |
| Mg | 1.14 | 1.46 |  | 1.44 |
| Ca |  | 0.7 |  | 0.7 |
| Al | 5.00 | 3.05 |  | 3.10 |
| Zn | 7.15 | 6.70 |  | 6.70 |
| Ni | 2.12 | 1.99 |  | 1.96 |
| Co | 2.89 | 2.70 |  | 2.67 |
| Bi | 0.094 | 0.002 |  | 0.001 |
| Sn | 0.11 | <0.001 |  | <0.001 |
| Sb | 0.17 | 0.008 |  | 0.008 |
| Pb | 0.023 | 0.006 |  | 0.007 |
| Hg | 0.52 | 0.44 |  | 0.0009 |
| Ag | 0.0044 | 0.0014 |  | <0.001 |
| P as $PO_4^{3-}$ | 0.53 | 0.11 |  | 0.090 |
| $Se_{total}$ | 0.083 | 0.010 | 0.0065 |  |
| $Se^{4+}$ | 0.040 | 0.004 |  | <0.001 |
| $Te_{total}$ | 0.095 | 0.001 | 0.001 |  |
| $Te^{4+}$ | 0.05 |  |  |  |

Typical concentrations of the impurities contained in the strong electrolyte, are as follows.

| Impurity | Maximum Concentration g/l | |
|---|---|---|
| Fe | 0.4 | |
| As | 0.04 | |
| Sb | 0.01 | |
| Bi | 0.008 | |
| Se | 0.002 | whereof $Se^{IV}$ <0.0005 |
| Te | 0.001 | whereof $Te^{IV}$ <0.0005 |
| Sn | 0.001 | |
| Pb | 0.016 | |
| Cl | 0.060 | |
| Ag | <0.0005 | |
| Hg | <0.0001 | |
| $PO_4$ | 0.09 | |

What is claimed is:

1. Process for producing high purity electrolytic copper with an electric conductivity of at least 58.8 mho × m/mm², and a maximum semi-hard temperature of 200° C by reduction electrolysis of a copper sulphate solution obtained by sulphuric acid leaching of crude cupriferous materials and containing in solution impurities which interfere with the electrolysis, characterized in that prior to the electrolysis the copper sulphate solution is subjected to purification to at least partially remove said impurities, comprising:

a first step in which the copper sulfate solution is maintained at a pH of 2.7–3.3, and a potential of at least 575 mv in relation to the standard hydrogen electrode for precipitation of part of said impurities, and the precipitated impurities are removed from the solution, and a second step in which the potential of the solution is reduced for formation of copper (I) compounds of at least part of the remaining impurities and precipitation of said copper (I) compounds, and the precipitated copper (I) compounds are removed from the solution, and electrolyzing solution subjected to said first and second steps to produce said high purity electrolytic copper.

2. Process of claim 1, wherein said copper sulfate solution contains sulfuric acid and the pH thereof is above 2.7, and sulfuric acid consuming material is added to the solution to provide said pH of 2.7–3.3.

3. Process of claim 2, wherein the sulphuric acid consuming material is at least one of hydroxides, carbonates or basic sulphates of metals the cations of which form compounds of low solubility with sulphate ions.

4. Process of claim 3, wherein the sulfuric acid consuming material is at least one of $Ca(OH)_2$ and $CaCO_3$.

5. Process of claim 4, wherein the first step the potential of at least 575 mv is provided by addition of an oxidizing agent to the solution, the temperature is 50°–90° C, and in the second step the potential of the solution is reduced to below 350 mv by adding a cupriferous reducing agent, the temperature is below 50° C, and the pH is below 3.

6. Process of claim 4, wherein said impurities in the copper sulfate solution subject to said first step are of the group Fe, As, Sb, Bi, Se, Te, Sn, Pb, Cl, Ag, Hg, and $PO_4$, and said remaining impurities are of the group Se, Cl, Ag, and Hg, and in the first step the potential of at least 575 mv is provided by addition of an oxidizing agent to the solution, the temperature is 50°–90° C, and in the second step the potential of the solution is reduced to below 350 mv by adding a cupriferous reducing agent, the temperature is below 50° C, and the pH is below 3, and the solution subjected to the first and second step contains 2–5 g/l of free sulfuric acid, a solids concentration of less than 20 mg/l.

7. Process of claim 2, wherein the sulfuric acid consuming material is at least one of metallic copper and copper compounds which consume sulfuric acid.

8. Process of claim 2, wherein the sulfuric acid consuming material is at least one of metallic copper, $Cu_2O$, $Cu(OH)_2$ and basic copper sulfate.

9. Process of claim 1, wherein in the first step the potential of at least 575 mv is provided by addition of an oxidizing agent to the solution.

10. Process of claim 9, wherein in the first step the oxidizing agent is air, oxygen, or an oxygen-containing gas other than air.

11. Process of claim 9, wherein the oxidizing agent is $H_2O_2$.

12. Process of claim 9, wherein the oxidizing agent is $MnO_2$.

13. Process of claim 1, the potential of the solution in the second step is reduced by adding a cupriferous reducing agent.

14. Process of claim 13, wherein the cupriferous reduction agent is metallic copper.

15. Process of claim 13, wherein the cupriferous reducing agent is $Cu_2O$.

16. Process of claim 13, wherein the cupriferous reducing agent is a sulfuric acid suspension of cuprous oxide.

17. Process of claim 1, wherein in the second step the precipitated copper (I) compounds are removed from the solution by precoat fine filtration to the extent that the filtered solution has a solids content of less than 20 mg/l.

18. Process of claim 17, wherein said solids content is less than 10 mg/l.

19. Process of claim 1, wherein said impurities in the copper sulfate solution subject to said first step are of the group Fe, As, Sb, Bi, Se, Te, Sn, Pb, Cl, Ag, Hg, and $PO_4$, and said remaining impurities are of the group Se, Cl, Ag, and Hg.

20. Process of claim 19, wherein the solution subjected to the first and second step contains 2–5 g/l of free sulfuric acid, a solids concentration of less than 20 mg/l.

21. Process of claim 1, wherein the impurities comprise at least one of As and $PO_4$, and in the first step the As is precipitated as $FeAsO_4$ and the $PO_4$ is precipitated as $FePO_4$, and the copper sulfate solution treated in the first step contains Fe in amount of at least about 120% of the stoichiometric amount for the formation of said $FeAsO_4$ and $FePO_4$.

22. Process of claim 21, wherein the impurities comprise chloride ion and said chloride ion is precipitated in the second step, and the temperature in the second step is below 50° C, and above the crystallization temperature of the solution.

23. Process of claim 1, wherein the temperature in the first step is 50°–90° C.

24. Process of claim 1, wherein the temperature in the first step is 60°–80° C.

25. Process of claim 1, wherein the potential in the second step is reduced to below 350 mv in relation to the standard $H_2$ electrode.

26. Process of claim 1, wherein the potential in the second step is reduced to 340–300 mv in relation to the standard $H_2$ electrode.

27. Process of claim 1, wherein the impurities comprise chloride ion and said chloride ion is precipitated in the second step, and the temperature in the second step is below 50° C, and above the crystallization temperature of the solution.

28. Process of claim 1, wherein the impurities comprise chloride ion and said chloride ion is precipitated in the second step, and the temperature in the second step is below 50° C, and above the crystallization temperature of the solution.

29. Process of claim 1, wherein the potential in the second step is reduced by adding $SO_2$.

30. Process of claim 1, wherein the pH for the second step is below 3.

31. Process of claim 1, wherein the pH for the second step is below 1.5–2.5.

32. Process of claim 1, wherein said copper sulfate solution is produced by leaching said crude cupriferous material with sulfuric acid, and said leaching results in said copper sulfate solution admixed with undissolved solid particles of the crude cupriferous material, said admixture is subjected to the first step, and said undissolved solid particles are removed simultaneously with the removal of said precipitated impurities in the first step.

33. Process of claim 1, wherein the pH of the first step is 2.9–3.1, the potential is 590–670 mv.

* * * * *

UNITED STATES PATENT OFFICE
CERTIFICATE OF CORRECTION

Patent No. 4,030,990          Dated June 21, 1977

Inventor(s) Norbert Piret et al.

It is certified that error appears in the above-identified patent and that said Letters Patent are hereby corrected as shown below:

Column 4, line 23, "anoxide" should be --an oxide--.

Column 10, line 44, "198.9°C" should be --198.8°C--.

Column 11, line 2, "pH X 3.1" should be --pH = 3.1--.

Column 11, line 3, "X 645" should be -- = 645--.

Column 12, line 14, "staring" should be --starting--.

Columns 11-12, Example 1, Table 1, for "Fe$^{3+}$" in column B, cancel "0.5" and in column C, insert --0.5--.

Columns 11-12, Example 1, Table 1, for "Ag" in column F, cancel "5.0" and in column G, insert --5.0--.

Columns 11-12, Example 2, Table 2, in column C, under "pH = 1.0" insert --33.8--.

UNITED STATES PATENT OFFICE
CERTIFICATE OF CORRECTION

Patent No. 4,030,990      Dated June 21, 1977

Inventor(s) Norbert Piret et al.

It is certified that error appears in the above-identified patent and that said Letters Patent are hereby corrected as shown below:

Columns 13-14, Example 3, Table 3, in column C, delete "0.0065" and "0.001".

Columns 13-14, Example 3, Table 3, column D, for "Se total" insert --0.0065-- and for "Te total" insert "0.001".

Signed and Sealed this

*Thirteenth* Day of *September 1977*

[SEAL]

*Attest:*

RUTH C. MASON      LUTRELLE F. PARKER
*Attesting Officer*      *Acting Commissioner of Patents and Trademarks*